UNITED STATES PATENT OFFICE.

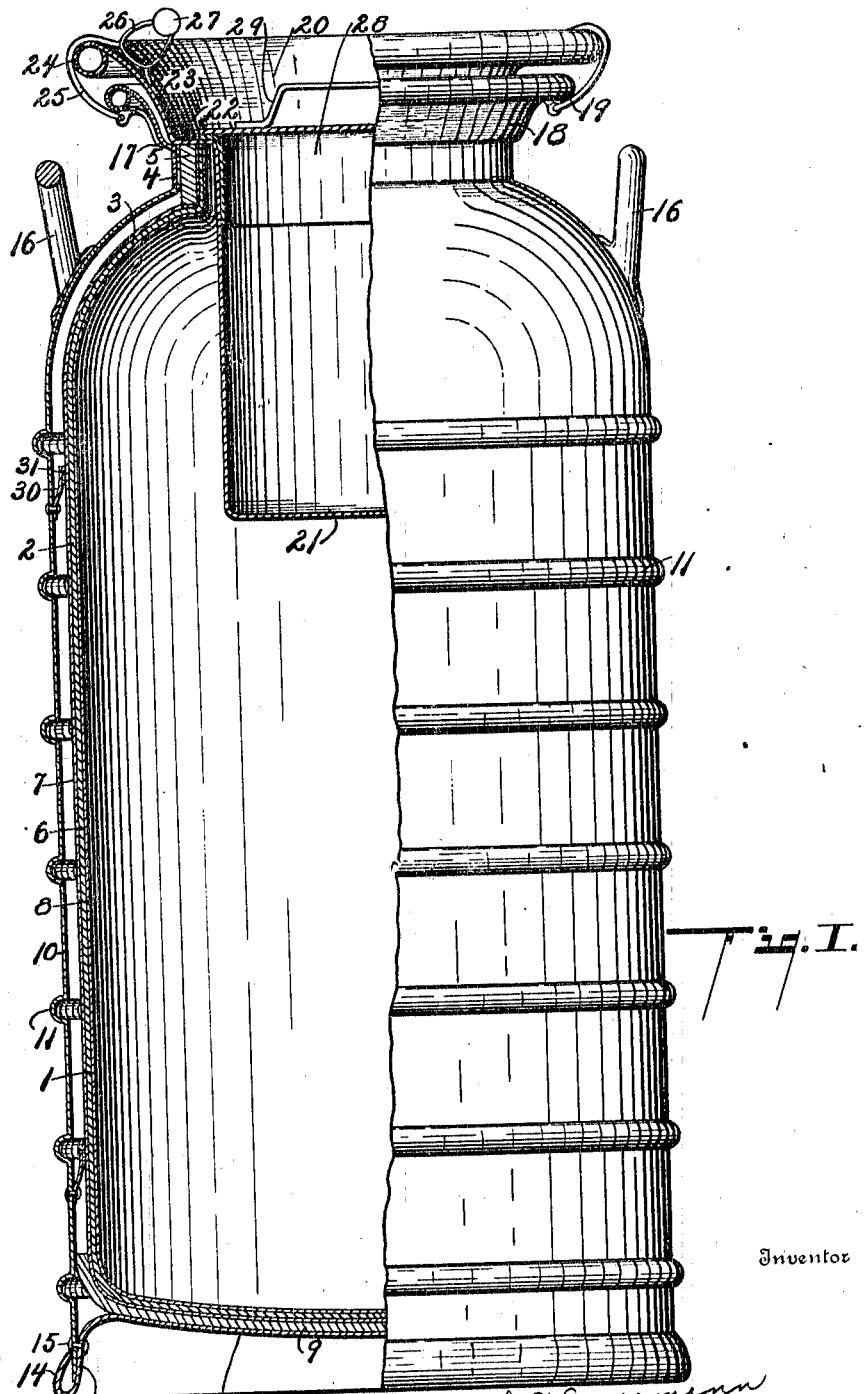

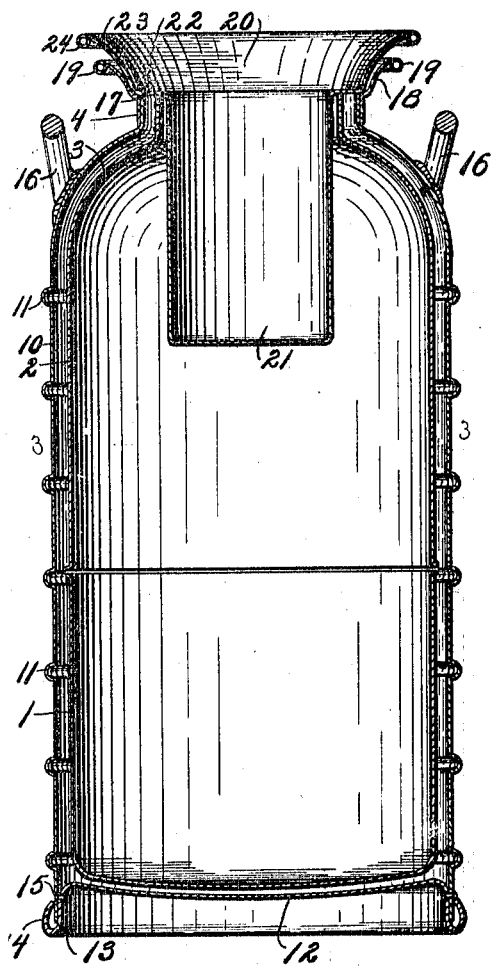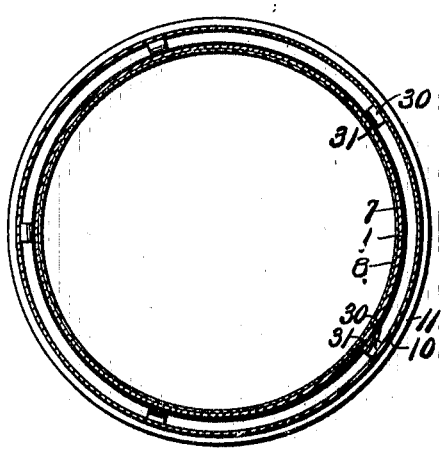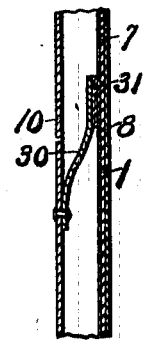

CARL H. ZWERMANN, OF KALAMAZOO, MICHIGAN.

MILK-CAN.

1,059,424.

Specification of Letters Patent. Patented Apr. 22, 1913.

Application filed August 22, 1910. Serial No. 578,271.

*To all whom it may concern:*

Be it known that I, CARL H. ZWERMANN, a citizen of the United States, residing at Kalamazoo, Michigan, have invented certain new and useful Improvements in Milk-Cans, of which the following is a specification.

This invention relates to improvements in milk cans.

The objects of this invention are: First, to provide an improved construction of milk can for shipping purposes in which the body of the can is coated with enamel and the can itself protected from injury, which injuries ordinarily in a shipping can would destroy the enamel. Second, to provide a construction of milk can which will be entirely sanitary. Third, to provide a milk can in which the milk can be effectively cooled and kept cool. Fourth, to provide an improved construction of bottom for a jacketed milk can. Fifth, to provide an improved construction of top for a milk can of this kind. Sixth, to provide an improved construction of cover, which can be effectively clamped in place, and avoid slopping or escape of the milk, or other contents of the can, for the can is effective for various purposes. Seventh, to provide an improved construction of outer jacket for protecting the enameled interior of a milk can.

Still further objects relating to details of construction will definitely appear from the detailed description to follow.

I accomplish the objects of my invention by the devices and means described in the following specification. The invention is clearly defined and pointed out in the claims.

A structure, which is a preferred embodiment of my invention, is fully illustrated in the accompanying drawing, forming a part of this specification, in which:

Figure 1 is a detail elevation view, partially in section, of a milk can embodying the features of my invention, showing definitely the arrangement of the parts. Fig. 2 is a vertical sectional elevation view, showing the method of assembling and uniting the parts. Fig. 3 is a transverse detail sectional view on a line corresponding to line 3—3 of Fig. 2, showing the method of supporting the interior casing by the spring fingers. Fig. 4 is a detail vertical sectional view of one of the spring fingers, and adjacent parts, showing the method of its contact and support for the inner enameled lining.

In the drawing, similar numerals of reference refer to similar parts throughout the several views.

Considering the numbered parts of the drawing, the lower portion 1 of the inner case of the can is suitably rounded and connected to the upper portion 2, which terminates in a suitable breast 3, which extends upwardly into a neck 4 and receives the upper heavy ring portion 5. The parts 1 and 2 are joined together by a suitable welded joint 6, and are coated on the outside by a layer of enamel 7 and on the inside with a layer of enamel 8.

The bottom of the can is supported by a piece of composition cork-board or annular insulator 9, which entirely surrounds and protects the same. An outer jacket 10 is suitably separated from the inner coated casing, and is provided with stiffening, transverse, annular ribs 11. The bottom 12 of sheet metal supports the insulator layer in contact with the inner casing and is flanged downwardly at 13 and upwardly at 14 around the bottom edge of the jacket 10 and is secured thereto by suitable rivets 15.

Handles 16 are suitably secured to the outer jacket, and the upper portion 17 of the can is flanged outwardly at 18 and terminates in a suitable beaded rim 19 at its upper edge.

A cover 20 fits within the same, and extends downwardly, forming an ice receptacle 21 within the can, and is provided with a flat shouldered portion 22 which fits the upper portion of the heavy ring 5, to which the necks of the inner casing and the outer can are suitably secured, the same being machined off to form a flat surface for a joint at that point. The cover is flat at 22 and is flanged upwardly and outwardly at 23 and terminates in a bead 24. The cover is secured in place by a spring clamp 25, which is connected by a seal 26 to a loop 27 on the said cover 20. An inner cover 28, provided with a handle 29, closes the ice receptacle 21.

Spring fingers 30 are secured to the jacket and extend obliquely inwardly into contact with the inner casing of the can, the enamel being protected from injury by an interposed leather cushion 31, which cushions the spring and prevents abrading of the enamel.

I desire to state that the structure of my improved can can be considerably modified without departing from my invention. I desire, however, to claim the specific form in which I have shown it, and also to claim the structure broadly.

The structure will lend itself to use with any suitable milk can cover. The one that I have here provided is adapted for hot weather shipment of milk or similar commodities. The structure would be very well protected and be a very good refrigerating can, even though the interior was not enameled. I have provided this structure as especially adapted and intended to protect the enameled inner casing, which is extremely necessary in a shipping can, else the blows to which it will be subjected will crack and injure the enamel and its effectiveness be entirely destroyed.

Having thus described my invention, what I claim as new and desire to secure by Letters Patent is:

1. In a milk can, an interior casing with rounded corners, with suitable enameled coating; an exterior jacket in spaced relation therefrom, suitably ribbed to stiffen the same; a cushion insulator bottom surrounding and supporting the bottom of the inner jacket and cushioning the same; a sheet metal exterior bottom shell conformed to the said insulator bottom and flanged around the lower edge of the said jacket and suitably joined thereto; a heavy metallic ring at the neck of said can for supporting the upper edge of the enameled inner casing, to which the jacket is secured, the whole dressed to a smooth joint at the top; suitable sheet metal parts secured externally to the said neck; and a cover with suitable shoulder conformed to the upper surface of the said ring substantially as described and for the purpose specified.

2. In a milk can, an interior casing with rounded corners, with suitable enameled coating; an exterior jacket in spaced relation therefrom, suitably ribbed to stiffen the same; a cushion insulator bottom surrounding and supporting the bottom of the inner jacket and cushioning the same; a sheet metal exterior bottom shell conformed to the said insulator bottom and flanged around the lower edge of the said jacket and suitably joined thereto; a heavy metallic ring at the neck of said can for supporting the upper edge of the enameled inner casing, to which the jacket is secured, the whole dressed to a smooth joint at the top; suitable sheet metal parts secured externally to the said neck; and a cover with suitable shoulder conformed to the upper surface of the said ring substantially as described and for the purpose specified.

3. In a milk can, an interior casing with rounded corners, with suitable enameled coating; an exterior jacket in spaced relation therefrom, suitably ribbed to stiffen the same; a cushion insulator bottom surrounding and supporting the bottom of the inner jacket and cushioning the same; a sheet metal exterior bottom shell conformed to the said insulator bottom and flanged around the lower edge of the said jacket and suitably joined thereto; a heavy metallic ring at the neck of said can for supporting the upper edge of the enameled inner casing, to which the jacket is secured, the whole dressed to a smooth joint at the top; and suitable sheet metal parts secured externally to the said neck; substantially as described and for the purpose specified.

4. In a milk can, an interior casing with rounded corners, with suitable enameled coating; an exterior jacket in spaced relation therefrom; a cushion insulator bottom surrounding and supporting the bottom of the inner jacket and cushioning the same; a sheet metal exterior bottom shell conformed to the said insulator bottom and flanged around the lower edge of the said jacket and suitably joined thereto; a heavy metallic ring at the neck of said can for supporting the upper edge of the enameled inner casing, to which the jacket is secured, the whole dressed to a smooth joint at the top; suitable sheet metal parts secured externally to the said neck; and a cover with suitable shoulder conformed to the upper surface of the said ring substantially as described and for the purpose specified.

5. In a milk can, an interior casing with rounded corners, with suitable enameled coating; an exterior jacket in spaced relation therefrom; a heavy metallic ring at the neck of said can for supporting the upper edge of the enameled inner casing, to which the jacket is secured, the whole dressed to a smooth joint at the top; suitable sheet metal parts secured externally to the said neck; and a cover with suitable shoulder conformed to the upper surface of the said ring substantially as described and for the purpose specified.

In witness whereof, I have hereunto set my hand and seal in the presence of two witnesses.

CARL H. ZWERMANN. [L. S.]

Witnesses:
MARGARET L. GLASGOW,
CHESTER E. WARNER.